(12) United States Patent
Fraivillig

(10) Patent No.: US 11,589,712 B2
(45) Date of Patent: Feb. 28, 2023

(54) APPARATUS AND METHOD FOR ISOSTATIC ROASTING OF AN UPRIGHT ANIMAL CARCASS

(71) Applicant: James B. Fraivillig, Boston, MA (US)

(72) Inventor: James B. Fraivillig, Boston, MA (US)

(73) Assignee: FRIVILLIO TECHNOLOGIES COMPANY, Boston, MA (US)

( * ) Notice: Subject to any disclaimer, the term of this patent is extended or adjusted under 35 U.S.C. 154(b) by 470 days.

(21) Appl. No.: 16/785,604

(22) Filed: Feb. 9, 2020

(65) Prior Publication Data

US 2020/0323394 A1    Oct. 15, 2020

Related U.S. Application Data

(60) Provisional application No. 62/803,617, filed on Feb. 11, 2019.

(51) Int. Cl.

| A47J 43/18 | (2006.01) |
|---|---|
| A47J 37/06 | (2006.01) |
| A47J 36/04 | (2006.01) |
| A47J 36/34 | (2006.01) |
| A47J 36/02 | (2006.01) |
| A47J 36/16 | (2006.01) |
| A23L 13/50 | (2016.01) |
| A47J 37/07 | (2006.01) |
| A23L 5/10 | (2016.01) |
| A47J 37/04 | (2006.01) |
| A47J 27/04 | (2006.01) |

(52) U.S. Cl.
CPC ............... *A47J 43/18* (2013.01); *A23L 5/13* (2016.08); *A23L 5/15* (2016.08); *A23L 13/55* (2016.08); *A47J 36/02* (2013.01); *A47J 36/022* (2013.01); *A47J 36/04* (2013.01); *A47J 36/16* (2013.01); *A47J 36/34* (2013.01); *A47J 37/049* (2013.01); *A47J 37/06* (2013.01); *A47J 37/0786* (2013.01); *A47J 2027/043* (2013.01)

(58) Field of Classification Search
CPC .......... A47J 43/18; A47J 36/022; A47J 36/04; A47J 36/16; A47J 36/34; A47J 37/06; A47J 2027/043; A47J 27/21166; A47J 36/02; A47J 37/049; A47J 37/0786; A23L 5/10; A23L 5/13; A23L 5/15; A23L 13/55
See application file for complete search history.

(56) References Cited

U.S. PATENT DOCUMENTS 3,955,487 A * 5/1976 Chetta, Jr. ............ A47J 37/0786 99/441
5,370,042 A * 12/1994 Tolchin ................. A47J 36/027 99/417

(Continued)

*Primary Examiner* — Drew E Becker
(74) *Attorney, Agent, or Firm* — John M. Brandt (57) ABSTRACT

An animal carcass cooking and roasting assembly and method of use in an oven, the assembly including a base tray, a liquid container mounted on and connected to the tray in a rack in a spaced apart upright position, the container arranged to receive a substantial amount of heat by conduction from the tray by the use of a tray and container connecting thermal via, the container arranged to fit within an open end of the carcass and wherein the opposite end of the carcass is tightly plugged or closed to form an isostatic chamber to contain liquid evaporated from the container within the carcass during the cooking process.

5 Claims, 5 Drawing Sheets

(56) References Cited

U.S. PATENT DOCUMENTS

| | | | | |
|---|---|---|---|---|
| 5,575,198 A * | 11/1996 | Lowery | A47J 43/18 | 99/449 |
| 5,893,320 A * | 4/1999 | Demaree | A47J 43/18 | 219/732 |
| 6,062,131 A * | 5/2000 | Holland | A47J 43/18 | 99/426 |
| 6,150,636 A * | 11/2000 | Bogdanski | A47J 27/002 | 219/443.1 |
| 6,192,792 B1 * | 2/2001 | Gremillion | A47J 43/18 | 99/347 |
| 6,460,452 B1 * | 10/2002 | Hester | A47J 37/049 | 99/347 |
| 6,553,896 B1 * | 4/2003 | Heide | A47J 43/18 | 99/347 |
| 7,166,822 B1 * | 1/2007 | Chang | A47J 36/34 | 219/521 |
| D717,600 S * | 11/2014 | Lu | | D7/409 |
| 9,802,739 B2 * | 10/2017 | Oldani | | B65D 81/18 |
| 2002/0100371 A1 * | 8/2002 | Snoke | A47J 37/01 | 99/426 |
| 2003/0221565 A1 * | 12/2003 | Finke | A47J 43/18 | 99/419 |
| 2004/0187699 A1 * | 9/2004 | Citrynell | A47J 43/18 | 99/426 |
| 2006/0057267 A1 * | 3/2006 | Dow | A47J 36/00 | 426/524 |
| 2008/0274243 A1 * | 11/2008 | Fang | A21B 3/13 | 249/168 |
| 2009/0152258 A1 * | 6/2009 | Schandel | A47J 27/004 | 219/439 |
| 2014/0272037 A1 * | 9/2014 | Frenkil, Sr. | A47J 29/02 | 220/573.1 |
| 2015/0008232 A1 * | 1/2015 | Fidanza | B65D 55/16 | 220/592.24 |
| 2018/0125302 A1 * | 5/2018 | Borovicka | A47J 43/18 | |

* cited by examiner

APPARATUS AND METHOD FOR ISOSTATIC ROASTING OF AN UPRIGHT ANIMAL CARCASS

CROSS REFERENCE TO RELATED APPLICATIONS

This application is based on the disclosure of U.S. Provisional Application No. 62/803,617 filed Feb. 11, 2019 by the same inventor and is hereby incorporated by reference.

BACKGROUND OF THE INVENTION

Field of the Invention

The invention resides in the field of meat cooking and roasting and more particularly relates to preparations performed in an oven wherein heat is simultaneously applied to both the interior and exterior of an animal carcass.

Description of the Prior Art

Beer-can devices have been a popular method to roast poultry, chicken for example, as these provide tender meat with only moderate control of the cooking process conditions, such as with a charcoal barbeque pit. A standard aluminum beverage can, typically a 12 ounce size, is partially filled with liquid such as beer, water, a seasoned broth, or soda and is inserted into the cavity of a chicken carcass, where it has a snug fit. The upright chicken is then put into the oven or grill, impaled on the beverage can, which can have a simple custom fixture or rack to steady the carcass assembly during roasting and handling. The oven or grill can have a wide temperature range during roasting, from 250-400° F., and the chicken is cooked when it reaches 165° F., which takes one to 2.5 hours depending on the oven temperature and size of the chicken. Due to the buffering effects of the water in the beverage can and its resulting vapor within the carcass cavity, the meat is ensured to be tender and juicy, regardless of processing conditions and the skills of the chef.

Further, the liquid in the beverage container can impart flavor to the meat during roasting. The skin of the chicken carcass is often pre-rubbed with dry seasoning. A dry rub provides a tasty and crispy skin after roasting, through the Maillard reaction. The chicken carcass can be marinated beforehand for added flavor and tenderness.

The metal rack that holds the beverage container while in the carcass is an integral stabilizing component of the process. Barbour International, Brandon, Miss. is a leader in the design and manufacture of these stainless-steel wire racks using the product trade name of Bayou Classics. In particular, U.S. Pat. Nos. 6,460,452, 6,503,551 and 6,557,460, Hester, disclose suitable designs and processes of the prior art.

It is important to note that these rack designs have the beverage can suspended above the surface of the cooking tray or pan, so that little or no heat conduction occurs to the beverage container and its liquid. For example, in the above examples, Hester specifically includes a bar across the ring upon which the beverage container sits.

While there are other rack designs on the market for the same purpose of roasting chicken with a container of liquid inserted in its cavity, most, in one way or another, as understood by the applicant, have the container suspended above the hot oven surface, more particularly, the supporting tray, thus greatly limiting the amount of heat transferred to the container by conduction. It would appear that the many existing designs of vertical rack chicken roasters purposely avoid thermal transfer by conduction into the container and its liquid from the hot tray beneath it to limit the amount of liquid evaporation from the container and the item undergoing cooking.

Further, as shown and described in the prior art Hester patents, the neck of the chicken is purposely left open allowing evaporated liquid from the container resulting in a substantial portion of the liquid to escape the inner cavity of the chicken.

In contrast to the prior art as best known to the applicant, at least two particular novel elements are disclosed herein, specifically a cooking assembly which maximizes heat transfer to the liquid container from the cooking surface or support, and the method of covering or plugging the neck hole in the top of the carcass to create an isostatic chamber to prevent the water vapor from the beverage container escaping the system, rather than interacting with the meat.

SUMMARY OF THE INVENTION

The invention may be summarized as an animal carcass cooking and roasting assembly and method of use in an oven in which the assembly includes a base tray, and a liquid container mounted on and thermally conductively connected to the tray in an upright position. The container is arranged to receive a substantial amount of heat by conduction from the tray, and is arranged to fit within an open end of the carcass, for example, a chicken carcass. In the accompanying method of use of the assembly, the opposite end of the carcass is plugged or closed to form an isostatic chamber to contain liquid evaporated from the container within the carcass during the cooking process.

Additionally, modification of a commercially available carcass and container support rack or framework for non-isostatic cooking as described above may be carried out by the herein disclosed addition of a novel thermal via to provide a heat conduction connection between the tray and liquid container, as well as a novel carcass plug to convert those prior art devices to the isostatic system of the invention.

In the invention, a metal thermal via connects the base of a hot oven to a container of water-based liquid that has been inserted snugly into the body cavity of an animal carcass, while the neck cavity is tightly plugged to prevent moisture from escaping the body cavity. The conducted heat from the oven's base vaporizes the liquid into the upright animal carcass, creating an isostatic system, wherein the meat and bones are internally gently steam-cooked. Simultaneously, radiant and convective heat from the hot oven roasts and browns the carcass from the outside. The exemplary container for chicken roasting is an aluminum beverage can, and the corresponding metal thermal via is designed to snugly fit the standard curved contour of the can's bottom, while being flush on the hot surface below it. Both of these features maximize thermal transfer to the carcass. Other features of the invention as will be more fully described below are as follows.

The method is a significant departure from existing tried-and-true beer-can chicken-roasting technology. With the innovative thermal via invention, the water-based liquid in the beverage container within the chicken cavity becomes a heat source, rather than a heat sink, as is the conventional beer-can approach.

The method is an extremely efficient use of energy to roast a carcass. The thermal via conducts energy, as heat, from the hot surface beneath as well as from the overall oven into the internal cavity of the chicken.

Roasting time can be significantly reduced, due to the higher thermal transfer from the thermal via.

Working like a mild version of a pressure-cooker vessel, the sealed carcass itself is slightly pressurized from the water vapor from the beverage can, and gently steams the meat for very even doneness. With thermal via roasting, the chicken carcass's external skin inflates slightly, separating from the body, which renders more fat and provides a very crispy and delicious skin, nicely browned by the Maillard reaction from the radiant and convective heat from the oven.

Compared to the conventional done temperature for chicken (160-165° F.), a higher doneness temperature of 190-195° F. is possible with the employment of the thermal via tenderizes the meat more, rendering more fat and gelatin (water-soluble protein, also referred to as collagen), while eliminating any possible risk of bacterial contamination.

At the maximum done temperatures, the high vapor pressure of the thermal via method can provide benefits in the evenness of cooking and extent of rendering the carcass.

As the assembly's reaction time to temperature changes within the oven reaching the carcass cavity through the thermal via is minimized, roasting while cycling oven temperature may offer advantages in processing and quality of the cooked meat.

Processing a carcass can be done in several progressive stages, with the assembly being removed from the heat before it is fully cooked, and then reinserted into a hot oven at a later time or date until the meat is done.

A completely cooked assembly can be inserted into a hot oven for very even reheating of the meat, as the thermal via transfer conducts heat to vaporize the liquid within the embedded container. Optionally, just a hot plate rather than a full oven can be used for this so that most or all of the energy is transferred into vaporizing the water, which gently steam-heats the meat, rather than additionally cooking the already-done meat with more radiant and convective energy.

Beyond fowl, it could even be preferable sometimes to roast animals with this invention that are larger carcasses, say, pigs, beef steer or mutton lamb, although entire industries now exist to use different parts of those animal in different processes in different locations.

To utilize this beer-can technology, the simple metal thermal via and neck cavity plug are the only items of additional equipment required beyond the traditional beer-can assembly. Optionally a pizza stone or equivalent ceramic or metal plate can be used with this invention, as it serves simultaneously as both a heat sink absorbing energy from the overall oven and heat source imparting energy into the pan and thermal via above.

The metal thermal via is very efficient to manufacture. An automated lathe, or screw machine, could produce these parts from aluminum rod stock quickly and efficiently. In high volume, the parts can also be made by casting molten aluminum in a mold.

As the thermal transfer through the thermal via is very dependent on the temperature of the bottom surface on which the assembly is resting, cycling the oven temperature during roasting may have advantages in processing. For instance, an ideal cycle for roasting a chicken could be 1) 15-25 minutes at 500° F., then 2) 10-25 minutes at 350° F., then 3) 15 more minutes at 500° F., followed by 4) turning the oven off, and letting the chicken assembly sit in the closed, cooling oven until ready to serve.

Intact assemblies can be reheated easily, either in an oven or even on a hot plate, through the vaporization of water in the embedded container into the cavity of the carcass.

DESCRIPTION OF THE PREFERRED EMBODIMENT

Figure 1:
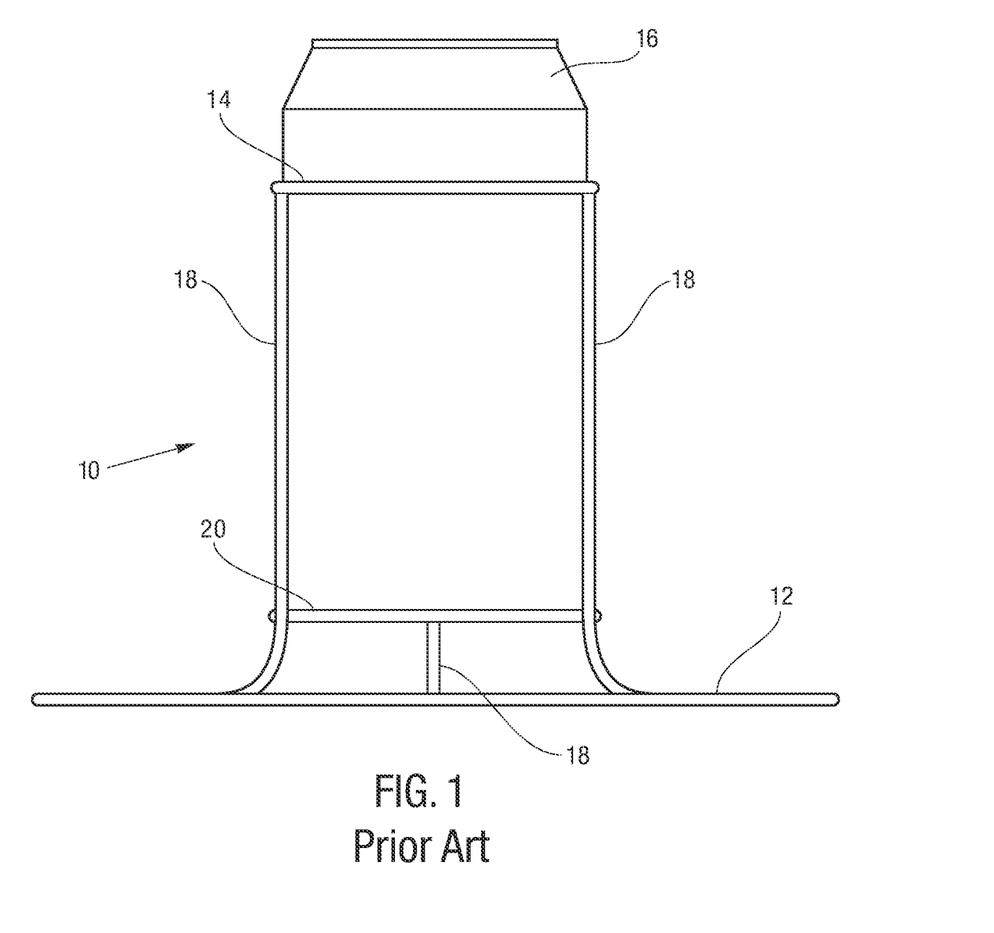
FIG. 1 is an elevation view of a rack assembly of the prior art suitable for use in the practice of the invention.

Referring first to FIG. 1, an elevation view of a liquid container-fowl rack or frame assembly 10 is shown. The frame 10 is comprised of a frame base ring 12 of a desired diameter and an upper frame support ring 14. The upper support ring 14 is of a diameter sufficient to encircle a liquid container comprising, for example, a standard size beverage can 16 when inserted within the ring. A plurality of L-shaped struts 18 are arrayed uniformly around the center of the base ring 12 and mounted to the base ring 12 so as provide a plurality of supporting members extending vertically from the base ring 12. The upper ring 14 is mounted to the vertical extending portion of the L-shaped struts 18 so as to support the ring 14 at a desired fixed location above the base ring 12. A L-shaped struts support ring 20 is mounted to the struts 18 at a desired point between the base ring 12 and the upper ring 14, the support ring 20 being concentric with and parallel to the base ring 12 and the upper ring 14. As shown, beverage can 16 may then be inserted within upper ring 14 and supported in an upright position by frame 10 by means of the L-shaped struts support ring 20 and struts 18.

Figure 2:
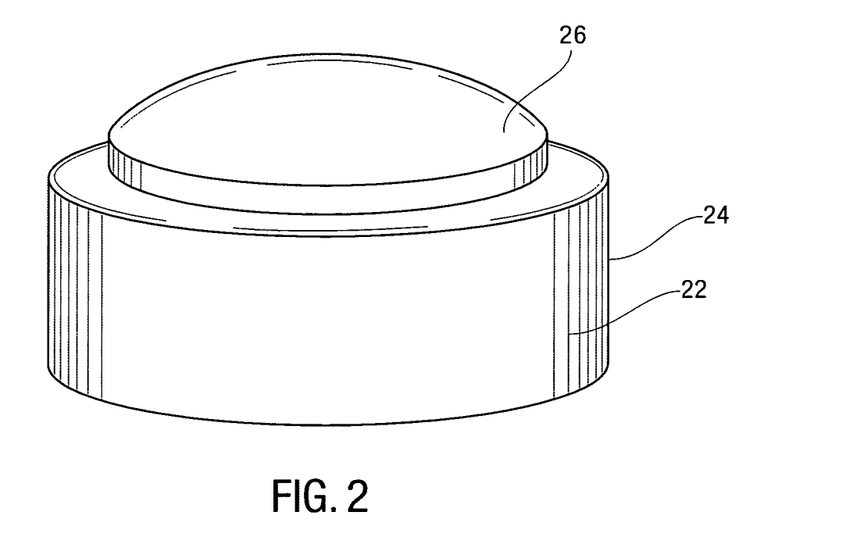
FIG. 2 is a perspective view of a first component of the invention.
Figure 3:
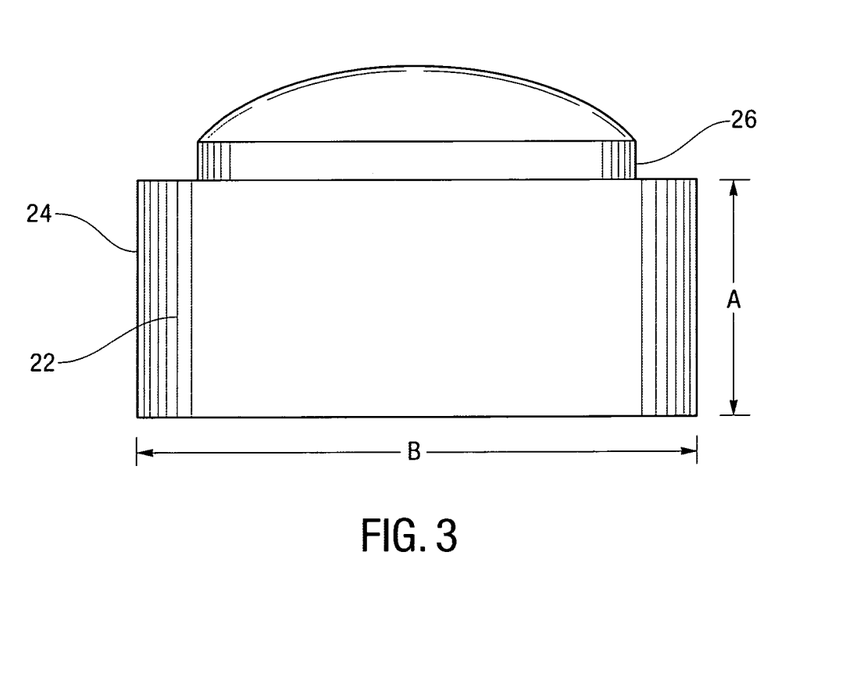
FIG. 3 is an elevation view of the component of FIG. 2.
Figure 4:
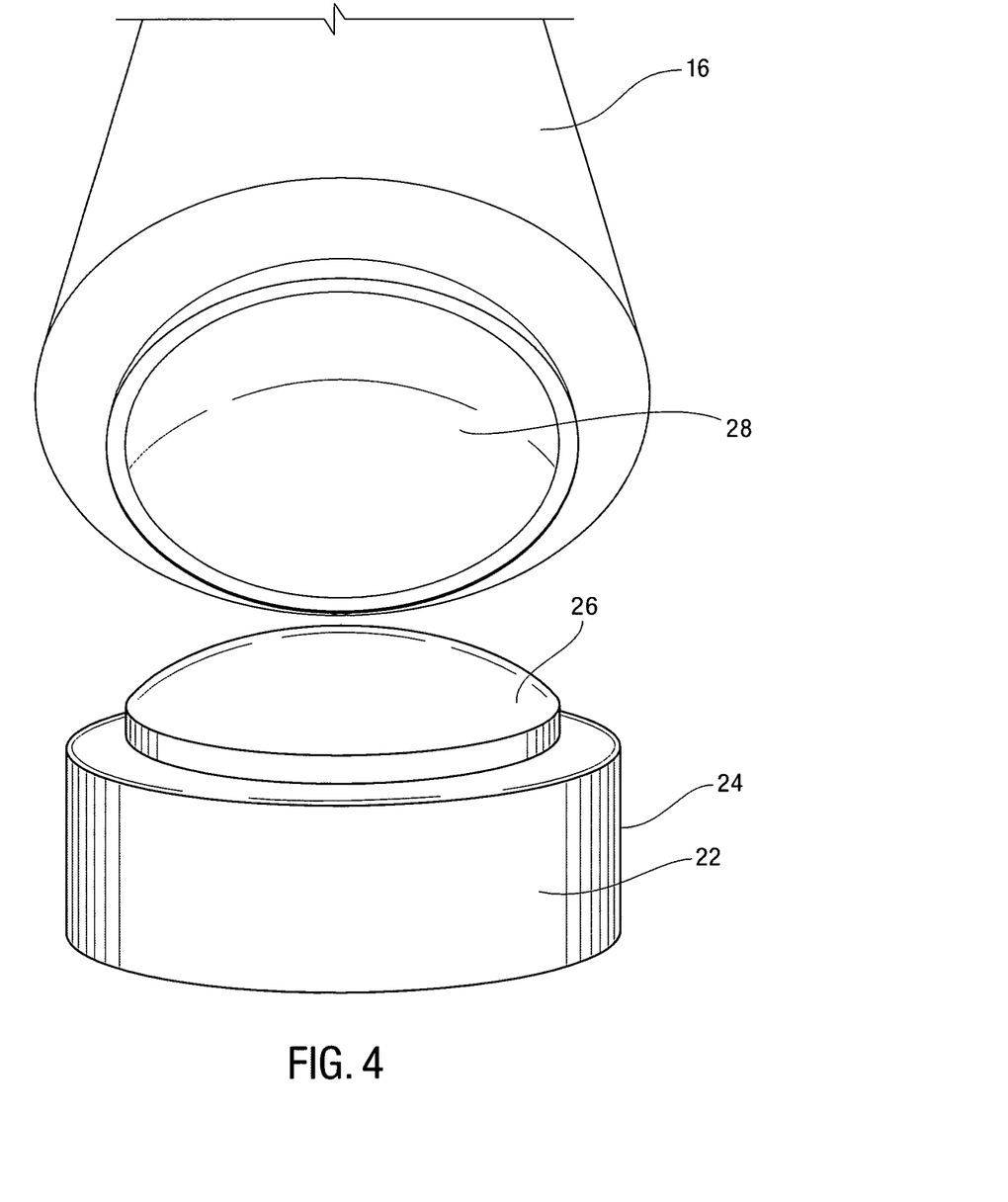
FIG. 4 is a perspective view of a portion of the components of FIG. 1 and FIG. 2.
Figure 5:
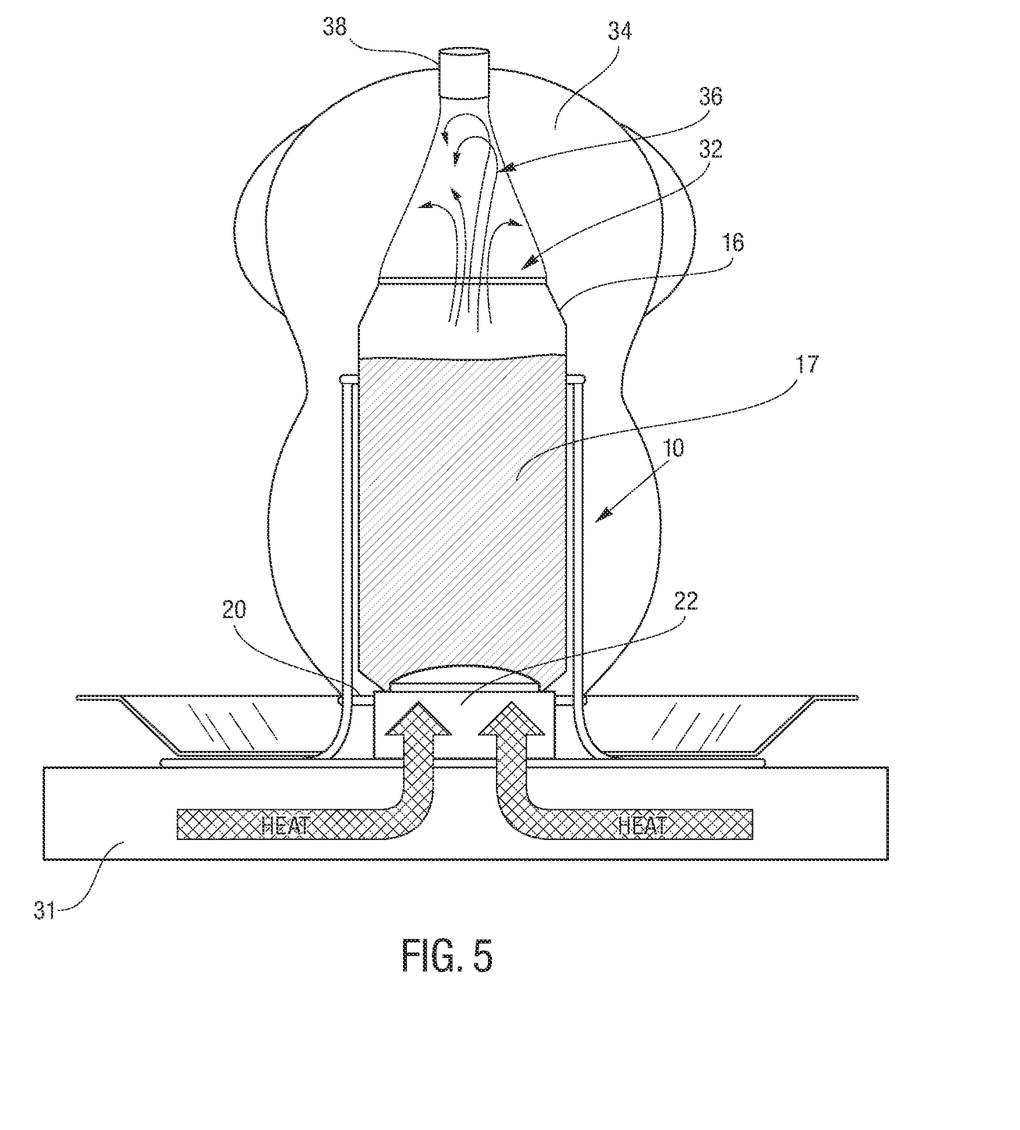
FIG. 5 is an elevation view of the combination FIG. 1 and FIG. 3 showing the prior art and the invention in use.

As shown in FIGS. 2 and 3, a solid metal thermal via 22 suitable for the practice of the invention is illustrated having a support base 24 of a selected height A and width B which base is configured to support a can bottom interface member 26 convexly shaped and sized to directly and tightly mate with a concave can bottom 28 supported in frame 10 as is further illustrated in FIGS. 4 and 5. It will be appreciated that a variety of metal liquid containers and, matching thermal vias as well as frame or rack sizes may be used in the invention as long as they are arranged to be dimensionally compatible in shape and size in the manner described above and as is shown by general example in FIG. 5.

FIG. 5 further illustrates the use of the thermal via 22 interposed between the beverage container 16 containing liquid 17 and an underlying metal, glass or ceramic tray 30 to transfer heat energy by conduction from an external oven (not shown) surface 31 into the cavity 32 of a chicken carcass 34. As indicated in the example of FIG. 4, thermal via 22 is conically shaped on top and flat on the bottom to maximize the intimacy of the surface contact with both the beverage container 16 and the underlying tray 30. The water based liquid in the beverage container is heated quickly by thermal conduction from surface 31 and the water vaporizes. The water vapor 36 transfers energy into the carcass through convection and condensation, roasting the meat faster and enabling a higher carcass temperature, while ensuring that the meat remains moist.

In, for example, electronic packaging, a thermal via is used to transfer heat generated by components into a heat sink for cooling. This thermal via invention works in reverse: the energy generated by an oven is transferred into a heat sink, the carcass, for roasting.

The water vapor is prevented from escaping cavity 32 by neck cavity plug 38 which transforms the cavity into an isostatic chamber. To optimize the roasting of the carcass, it is critical that the neck opening be completely sealed at all times during the cooking cycle. Loss of the seal will allow the water vapor that has been generated to escape the cavity dramatically lowering the temperature and subsequent steaming of the meat.

It is advantageous that the neck cavity plug has the following characteristics:

Be constructed of a reusable washable material; be conformable enough to allow forced insertion into a smaller hole; be expandable during the cooking cycle, which physically works to gently stress the cooking meat, breaking membranes and tissue connections, while rendering off more fat; and be heat resistant, as it resides in the top of the oven chamber, the hottest part, during cooking.

Other features can include a top appendage or finger grip to assist insertion through the carcass cavity, by pulling from the topside, and the inclusion a bottom sensor to monitor the isostatic chamber temperature just above the container with the liquid, to provide the best gauge of internal cooking rates.

An example of a simple cost-effective plug 38 is made from food-grade silicone foam, which is temperature-resistant and widely used in food processing. The foam should have moderate conformability. The foam can be pigmented for marketing. The foam is molded into a cylinder rod with an OD of 1-2" width, and is which is then cut into 2-4" lengths to make the plug. This material is available from, for example, Changzhou Rongpai Rubber & Plastic Product Co., Ltd. of Changzhou, CHINA.

Before cooking, the plug is inserted into the neck opening through the cavity. As the carcass is roasted and the meat is denatured, the foam plug will expand outward radially, which ensures the isostatic seal, maximizing steam pressure and meat tenderization, and also applies continuous stress on the roasting meat, breaking down membranes and rendering fat.

In fancier plug designs, additional functionality can be added to the plug. These parts could be metal-based, and the silicone foam can be molded around the metal pieces. A sensor can be installed in the bottom of the plug, which rests in the isostatic cavity during use. This can monitor temperature directly above the container with liquid. Metal or plastic parts embedded within the silicone-foam column can also assist, as temperature increases, the X-Y expansion of the plug during roasting. A metal or plastic finger grip can be incorporated into the top of the plug to assist in insertion prior to cooking, as the plug can be pulled into place.

This invention can be applied to the roasting of any edible animal carcass where the skin can be left on and the entire body roasted at once, such as with a chicken or a pig on a spit. Leaving the skin on the carcass allows the system to condense and retain most of the water vapor evolved during the roasting process, which further cooks the meat and makes it moist and tender. Assuming that all carcass orifices are well-plugged to prevent water-vapor leakage, the system should approach an isostatic state, where temperature and vapor-pressure are consistent throughout.

The conventional roasting of animal carcasses only utilizes external radiant and convection heat from the oven to cook the meat. With conventional beer-can chicken roasting, the container with the liquid inserted into the body cavity is not connected thermally to the oven (physically intimate contact, as to allow heat conduction), and so the liquid in the container only serves as a heat sink, not a heat source (i.e., from vaporization-then-condensation, as with this invention).

The production of the thermal vias would be very straightforward and inexpensive, but customization in appearance may also be warranted, even though the basic functionality is not impacted. The metal used to make the thermal vias would be preferably inexpensive, highly thermal conductive, not susceptible to oxidation or other attack, and be easy to machine, mold, and/or cast. The commodity-metal aluminum meets all these criteria. Other inexpensive conductive metals would include brass or plated copper. Of course, luxury models could also be made with precious metals. Designs or inscriptions on the vertical sides of the cylinder would offer further customization opportunities.

The thermal via can be rotary-machined from an aluminum metal rod. Automated equipment would make these parts quickly and efficiently. In high volume, the parts could also be produced by molding or die-casting, again preferably with aluminum, although these processes require special high-temperature processing and fixturing.

An example of the roasting process of the invention for a chicken carcass is as follows:

A 12 or 16 oz. aluminum beverage container is partially filled with liquid. Any water-based liquid will work, and this allows for chef-customization. Water, beer and soda are the conventional liquids, though other spirits or even seasoned broth would do.

The container is put into the frame in an upright position. The container and frame are inserted snugly into the carcass. This assembly is then put onto the metal thermal via, with the concave female surface on the container's bottom side mating intimately with the convex male surface on the top side of the thermal via, maximizing thermal transfer. To further ensure maximum thermal transfer, a coating of a water-insoluble, oil-based food product, such as butter or Crisco, can be applied to one or both of the surfaces to be mated. Additionally, that same coating is applied to the bottom surface of the thermal via, to ensure good thermal transfer with the pan.

Plug the neck cavity of the upright carcass on the frame and thermal via to prevent the evolved water vapor from escaping to ambient, which would negate all the benefits of this method. An example of a suitable plug is a food-grade silicone-foam cylindrical plug (25-40 mm OD) described above, which not only prevents generated steam from escaping the carcass, but also expands incrementally during roasting, which helps denature the meat.

This assembly is put into a metal, ceramic or glass pan that can catch the drippings from the carcass during roasting. The pan should be planar on both sides to maximize contact with both the thermal via and the adjacent support surface below. Some water is typically put into the pan, although leaving the pan dry accelerates the thermal transfer to the thermal via, as any water evaporating in the pan dramatically reduces the pan's surface temperatures and, hence, the thermal-via temperature.

An oven has been pre-heated with a large ceramic or metal surface on the oven's tray to act as a conduction heat source for the thermal via. A conventional pizza stone is a prime example. The oven temperature is set at 350-550° F. A high oven temperature, say 500° F., is recommended as that accelerates the internal-roasting process and ensures the Maillard reaction within the carcass skin. As is widely known, with the moderating effect of the beer-can cooking method, burning or overcooking the carcass and its meat is not generally a concern. Oven temperature can also be modulated to optimize the process. For instance, after an initial 15-25 minutes at 500° F., the oven temperature is reduced to 350° F. for a period of 10-30 minutes, and then set back at 500° F. until the roasting is complete. In addition, the hot oven can be shut off towards the end of the cooking cycle, and the carcass assembly can be left in the closed oven while it cools down, and then even overnight, as ovens are self-sterilizing and no additional potential contamination has entered the chamber.

When in the hot oven, through conduction, heat transfers quickly from the hot surface of the pizza stone, through the pan, and into the thermal via, which transfers heat into the liquid in the container. The water then vaporizes and permeates the carcass, but is trapped by the skin, and so condenses. Condensing water vapor heats, and contributes to cooking the meat, while keeping it moist and tender.

With this invention the transfer of energy, in the form of heat conduction, from the oven and especially the pizza stone into the inside of the carcass, the liquid in the container becomes a heat source, not a heat sink. This is accomplished while not losing any of the advantages of beer-can roasting, such as moderated cooking, flavorizing and ensuring moist and tender meat.

When roasting chicken carcasses, it has been seen that a 'tallboy' 16-ounce can is more effective than a standard 12-ounce can at transferring heat into the chicken cavity. The extra 1.4"-height increase of the 16-ounce can enables more vertical aluminum surface to be subjected to the hot oven convection, rather than be embedded within the carcass, which cools the liquid. This incremental heating, along with the natural chimney effect, provides a significant boost to the thermal via conduction heating of the liquid within the can, and hence the roasting process.

As with other cooking methods, it is important to monitor the meat to ensure doneness with a meat thermometer. The conventional wisdom is that a roasting chicken needs to be removed from the oven when its internal temperature reaches 160-165° F., as higher meat temperature will result in overdone, over-dried meat. That temperature is required not only for doneness, but also killing bacteria in the carcass (salmonella is a common contaminant of poultry products). This same 160-165° F. guideline applies to traditional beer-can roasting as well.

The inventor has found that the thermal-via beer-can roasting technology can impart a chicken-carcass final temperature of 190-195° F., with an accelerated meat-temperature rise at the end of the cooking cycle, when the meat is apparently done or nearing it. As opposed to conventional methods, the increased temperature with thermal via does not result in overcooking nor over drying the meat, thanks to the embedded water reservoir in the chicken's cavity. To the contrary, the 30° F. difference tenderizes the meat, especially the breast meat, which can often be tough, notably with large chickens, as well as renders more water-soluble collagen, as well as more water-insoluble fat from the carcass in the dark-meat regions. Through the advanced roasting and rendering, the higher temperature also possibly lightens the shade of the dark meat. Finally, the increased temperature certainly eliminates any possible risk of bacterial contamination of the roasted meat.

Figure 6:
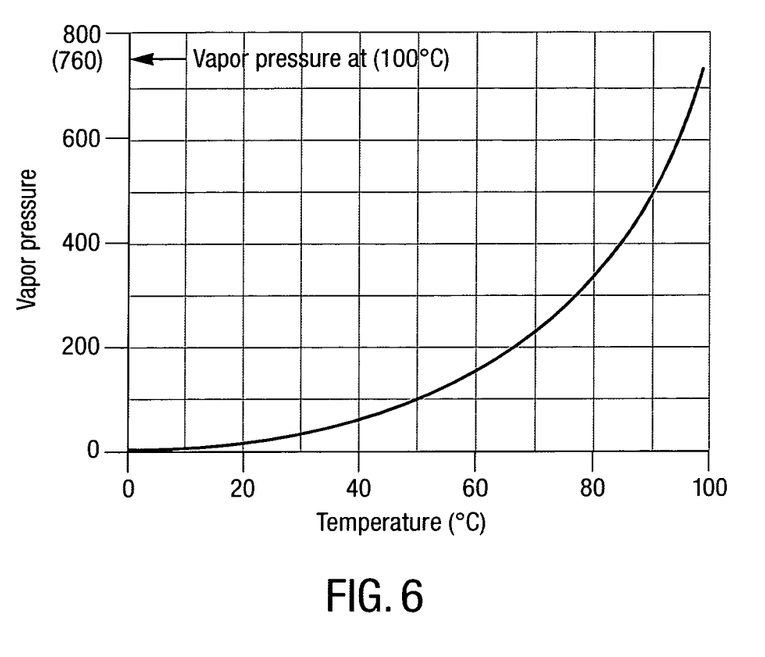
FIG. 6 is a graph relating physical conditions in the process of the invention.

As shown in FIG. 6, the higher temperature within the chicken also enables a higher water-vapor pressure within the carcass. At 165° F., 74° C., the general maximum temperature for chicken doneness, even with conventional beer-can technology, the vapor pressure of water is about 280 torr. In contrast, at 195° F. (90° C.), the vapor pressure is over 80% higher, at about 510 torr. This significant increase in vapor pressure can function in rendering the heat and nicely separating the crispy skin from the meat.

With regards to the higher final roasting temperature of this invention, chemical reaction rates can be estimated from the Arrhenius equation, which allows that every 10° C. (16° F.) in temperature exposure doubles the reaction rate, when around a phase-transition temperature (this transition being the cooking of chicken meat). Therefore, the 30° F. increase in final temperature vs. that of conventional chicken roasting increases the reaction or cooking rate within the chicken carcass by a factor of almost 4×. It should be noted that keeping the carcass at 190-195° C. for an extended period of time will break down the flesh, and, while still moist and tender, may yield a meat texture that consumers could find unfamiliar and unappetizing. Therefore, it is be advisable to moderate the exposure time at high temperature.

After the roasted chicken is removed from the oven, it is generally recommended that the assembly sits idle until the meat temperature drops to 140-150° F. or less before carving, as that ensures the moistest meat, with juices reconstituting into the meat, and not draining away nor evaporating.

The roasted chicken can also be cold-stored upright on the same assembly, and then be reheated in an oven at a later time, with the thermal via again assisting the heating process.

What is claimed is:

1. In an animal carcass cooking and roasting assembly configured for use in an oven, said carcass having an interior cavity, said cavity having a head opening and a tail opening, said assembly comprising in combination:
  A. a base tray having a top and bottom surface;
  B. a liquid evaporation container having a top side and a bottom side, said container having a port disposed in said top side for the omission of liquid vapor
     wherein said liquid evaporation container comprises a beverage can having a concave profile bottom side;
  C. a frame mounted on said top surface of said tray in a spaced apart upright position comprising a rack for supporting said animal carcass, said frame further comprising a liquid evaporation container holder, said holder positioned to receive and orient said liquid evaporation container in an upright position with respect to said top surface of said tray; said container and said holder positioned to extend within said animal carcuss interior cavity from said tail end
     wherein said frame comprises a plurality of upright L-shaped strut members arranged in a circular configuration, each having a top end and a lower end with respect to said tray, an open upper ring attached to the top end of said struts and an open lower ring, each of said rings having an internal diameter greater than that of said beverage can;
  D. an insertable thermal via comprising a block of metal having an upper surface and a lower surface positioned between said top surface of said base tray and said bottom side of said liquid evaporation container, said via having an upper convex surface to match the size and profile of said liquid evaporation container bottom side and said via lower surface configured to match the profile of said base tray top surface, said via having a base diameter greater than that of the lower diameter of said bottom side of said beverage can to support said can in an upright position
    whereby a direct intimate thermal connection by conduction is provided between the relevant surfaces of said tray, said via, and said liquid evaporation container; and E. a plug to seal said carcass head opening to create an isostatic chamber of said cavity to contain liquid evaporated from said liquid evaporation container within said carcass during the cooking process.

2. The assembly of claim 1 wherein said plug comprises a cylinder of food grade silicone rubber of from one to two inches in outside diameter and two to four inches in length.

3. An animal carcass isostatic cooking and roasting method for use in an oven, said carcass having an interior cavity, said cavity having a head opening and a tail opening, said method comprising in combination the steps of:

A. providing a cooking assembly comprising in combination:
  i. a base tray having a top and bottom surface;
  ii. a liquid evaporation container having a top side and a bottom side, said container having a port disposed in said top side for the omission of liquid vapor
    wherein said liquid evaporation container comprises a beverage can having a concave profile bottom side;
  iii. a frame mounted on said top surface of said tray in a spaced apart upright position comprising a rack for supporting said animal carcass, said frame further comprising a liquid evaporation container holder, said holder positioned to receive and orient said liquid evaporation container in an upright position with respect to said top surface of said tray; said container and said holder positioned to extend within said animal carcuss interior cavity from said tail end wherein said frame comprises a plurality of upright L-shaped strut members arranged in a circular configuration, each having a top end and a lower end with respect to said tray, an open upper ring attached to the top end of said struts and an open lower ring, each of said rings having an internal diameter greater than that of said beverage can;
  iv. an insertable thermal via comprising a block of metal having an upper surface and a lower surface positioned between said top surface of said base tray and said bottom side of said liquid evaporation container, said via having an upper convex surface to match the size and profile of said liquid evaporation container bottom side and said via lower surface configured to match the profile of said base tray top surface, said via having a base diameter greater than that of the lower diameter of said bottom side of said beverage can to support said can in an upright position
    whereby a direct intimate thermal connection by conduction is provided between the relevant surfaces of said tray, said via, and said liquid evaporation container; and
  v. a plug to seal said carcass head opening to create an isostatic chamber of said cavity to contain liquid evaporated from said liquid evaporation container within said carcass during the cooking process;

B. filling said liquid evaporation container with a desired amount of an appropriate cooking liquid;
C. inserting said liquid evaporation container into said liquid evaporation container holder;
D. inserting said thermal via between said top surface of said base tray and said bottom side of said liquid evaporation container;
E. inserting said plug in said carcass head opening;
F. mounting said carcass on said assembly;
G. inserting said assembly and said carcass into said oven; and
H. Cooking said carcass to at least an internal temperature of 160° F.

4. The method of claim 3 wherein said plug comprises a cylinder of food grade silicone rubber of from one to two inches in outside diameter and two to four inches in length.

5. The method of claim 3 wherein the cooking steps in said oven comprise:
A. 15-25 minutes at 500° F. followed by
B. 10-25 minutes at 350° F. followed by
C. 15 more minutes at 500° F. followed by
D. turning the oven off and leaving the chicken disposed in the cooking and roasting assembly in the closed cooling oven until ready to serve.

* * * * *